United States Patent [19]

Eshelman

[11] 4,254,978
[45] Mar. 10, 1981

[54] MULTIPLE STAGE FLEXIBLE BUMPER

[76] Inventor: Cheston L. Eshelman, 621 NE 30 Ter., Miami, Fla. 33137

[21] Appl. No.: 914,123

[22] Filed: Jun. 9, 1978

Related U.S. Application Data

[63] Continuation-in-part of Ser. No. 822,365, Aug. 5, 1977, abandoned.

[51] Int. Cl.³ .............................................. B60R 19/06
[52] U.S. Cl. .................................. 293/137; 267/179; 293/155
[58] Field of Search ........ 293/121, 124, 132, 135–137, 293/154, 155; 267/139, 166, 168, 170, 178, 179

[56] References Cited

U.S. PATENT DOCUMENTS

| | | |
|---|---|---|
| 1,372,839 | 3/1921 | Solomon ............................. 293/137 |
| 1,416,358 | 5/1922 | Krefl ..................................... 293/85 |
| 1,530,017 | 3/1925 | Souliotis ......................... 293/137 X |
| 3,169,757 | 2/1965 | Roder et al. ......................... 267/170 |
| 3,897,095 | 7/1975 | Glance et al. ....................... 293/120 |
| 3,997,208 | 12/1976 | Nomiyama .......................... 293/137 |
| 4,093,198 | 6/1978 | Petersen .............................. 267/179 |

FOREIGN PATENT DOCUMENTS

| | | | |
|---|---|---|---|
| 216787 | 8/1961 | Fed. Rep. of Germany ........... 293/179 |
| 1055144 | 10/1953 | France .................................... 293/137 |

Primary Examiner—John J. Love
Assistant Examiner—D. W. Underwood

[57] ABSTRACT

In a highway type motor vehicle, a Multiple Stage Flexible Bumper comprising in combination a bumper bar mounted transversely across the front of the motor vehicle, multiple stage coil compression springs, a pair of spring seats to secure the ends of the springs, retainer bolts for securing the ends of the springs in the seats, longitudinal bolts, rivets or welds for securing the seats on one end of the springs to the vehicle frame, longitudinal bolts, rivets or welds for securing the seats on the other end of the springs to the vehicle bumper bar to form a completely flexible, 360° unencumbered movement of the bumper bar around the axis of the longitudinal frame and allow the bumper bar to provide maximum protection from all types of angular collisions when the bumper bar strikes an obstruction before it or at the corner of it by means of telescoping multiple stage coil compression springs that have all stages firmly anchored at the inward ends at the vehicle frame and on the outward ends the primary springs stage one firmly anchored at the vehicle bumper bar with the outward ends of the helper springs floating loose within the inside diameter of the primary spring and the helper springs only being displayed when the bumper bar moves longitudinally against or laterally against said stages of helper springs in telescopic action providing increased resistance as the load increases and thereby the energy of motion is dissipated into the compression springs.

7 Claims, 17 Drawing Figures

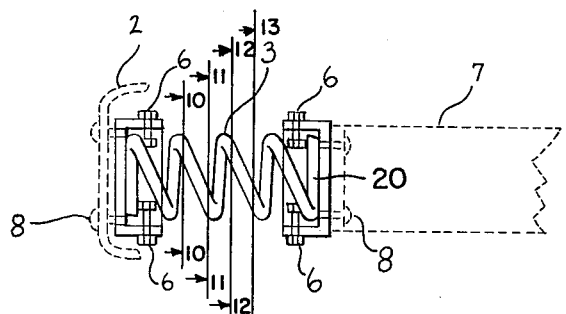
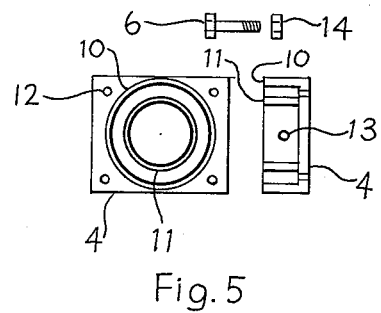
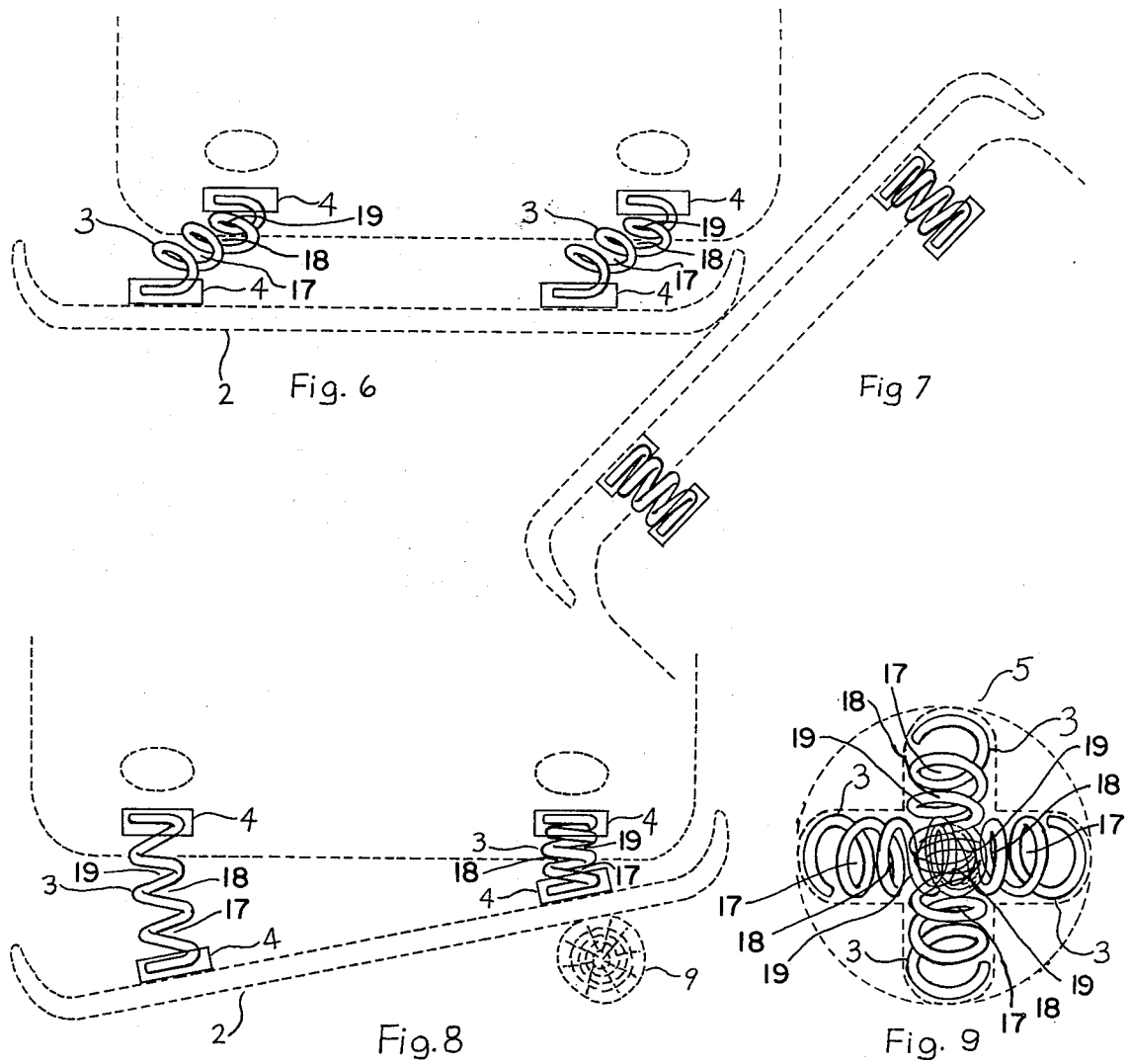

4,254,978

MULTIPLE STAGE FLEXIBLE BUMPER

APPLICATION

This is a continuation-in-part of Ser. No. 822,365 filed 8-5-77 and now abandoned.

BACKGROUND OF THE INVENTION

My invention relates to an improvement in a Multiple Stage Flexible Bumper for a highway vehicle using multiple stage compression springs mounted to the front or rear of the vehicle so that it will operate to absorb the energy of a collision, to offer "crash-worthiness" and to help protect the occupants from death or injury and help prevent the vehicle from unnecessary damage in a collision.

With the ever-increasing use of express highways and the high cruising speed of modern automobiles plus the increased number of vehicles on the roads, there is a steady increase in traffic collisions with many deaths and serious injuries due to high speed collision with a barrier or headon collision into an oncoming vehicle. One can hardly read a newspaper or watch the news on television without seeing a head-on collision of an automobile resulting in fatalities or injuries.

Insurance records show that the new so-called 5 MPH metal bumpers with hydraulic cylinders to allow 3 inches movement upon impact, cost more to repair than the old style bumpers.

A recent study made by the U.S. Department of Transportation "shows that 5 MPH bumpers reduce over-all property damage by 5 to 10%, while 10 MPH bumpers would cut property damage by nearly 50%". Ref.: Automotive News, 8-30-76.

Another study made by the U.S.D.O.T. shows: —"Car accidents cost $ 38 billion a year". Ref.: Associated Press 3-17-77. It is an object of my invention to withstand impacts comfortably, without injury or damage as follows: 20 MPH into another car, 10 MPG into a rigid barrier, 10 MPH corner or side impact and a lateral absorption stroke of approximately 5 to 10" and a longitudinal absorption stroke of approximately 5 to 10".

It is another object of my invention to provide the bumper bar 360° free, unencumbered movement around the longitudinal mounting axis on the frame of the vehicle to prevent bent frames, broken welds, dented sheet metal and other damage caused by various angular collisions in the front or rear of the motor vehicle.

It is another object of my invention to provide added resistance to collision forces through telescoping helper springs that compress in stages as the bumper bar moves back against them.

It is another object of my invention to use conventional size springs which are in mass production, inexpensive and light in weight rather than an extra large single spring on each side which would be unconventional in size, too heavy and too rigid for slow speed collisions such as occur in parking lots.

It is still another object of my invention to provide a flexible filler panel to cover the springs and fill the gap between the bumper bar and car body for aesthetics purposes.

BRIEF DESCRIPTION OF THE DRAWINGS

FIG. 4. Side assembly view of my telescoping Multiple Stage Flexible Bumper taken along line 4—4.

FIG. 5. View of spring seat and means for securing primary spring stage one in seat at bumper bar.

FIG. 6. Top perspective view, showing lateral motion when car is struck at corner.

FIG. 7. View of striking car showing equal rearward motion.

FIG. 8. Top perspective view, showing car being struck in front off-center collision demonstrating its rearward flexible motion in one side.

FIG. 9. End view showing 360° flexibility of coil compression springs around mounting axis thereof.

Figure 1:
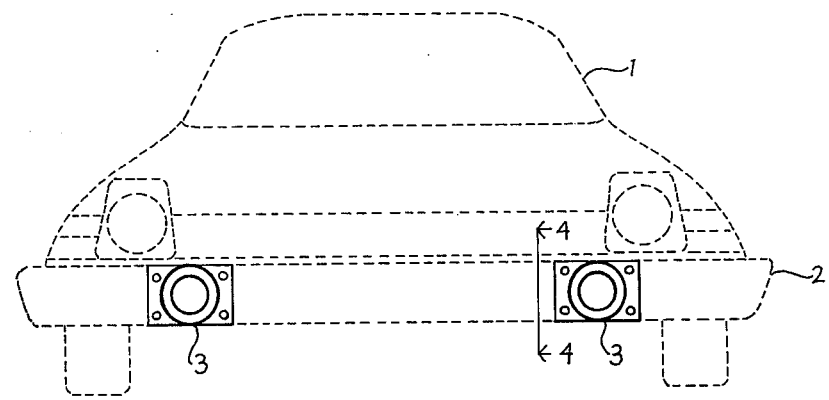
FIG. 1. Front perspective view of my Multiple Stage Flexible Bumper.
Figure 2:
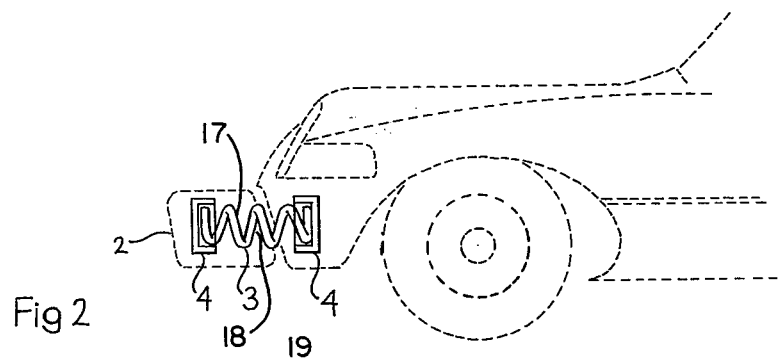
FIG. 2. Side view thereof showing unobstructed spring attachment between the car body and bumper bar allowing 360° unencumbered movement of same.
Figure 3:
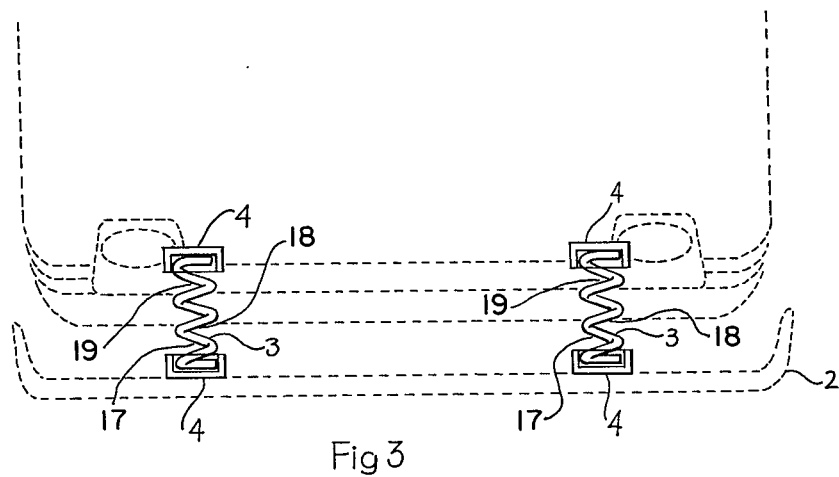
FIG. 3. Top view thereof, with the bottom view being a mirror image of the top.
Figures 10, 11, 12, 13, 14:
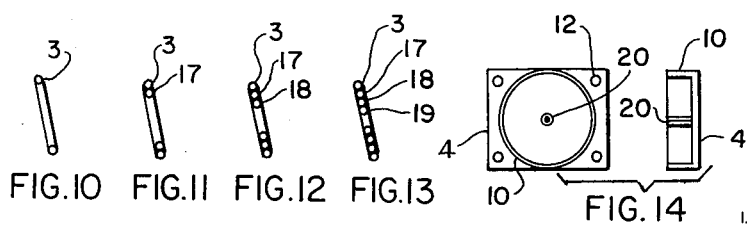
FIG. 10. Sectional view taken through stage one of primary spring.
FIG. 11. Sectional view taken through outward loop of stage two helper spring.
FIG. 12. Sectional view taken through outward loop of stage three helper spring.
FIG. 13. Sectional view taken through outward loop of stage four helper spring.
FIG. 14. View of spring seat and means for securing inward ends of primary spring and inward ends of all stages of helper springs in the seats at the vehicle longitudinal frame.
Figure 15:
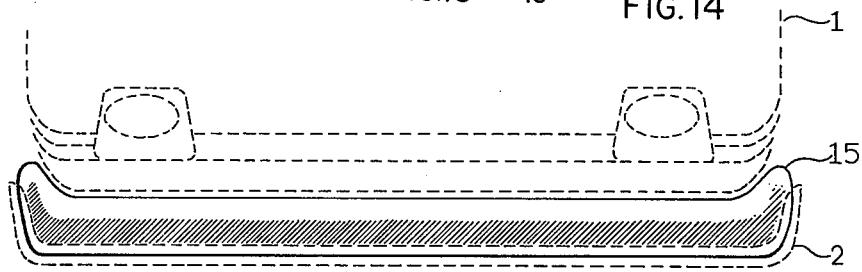
FIG. 15. Top plan view showing flexible filler panel.
Figure 16:
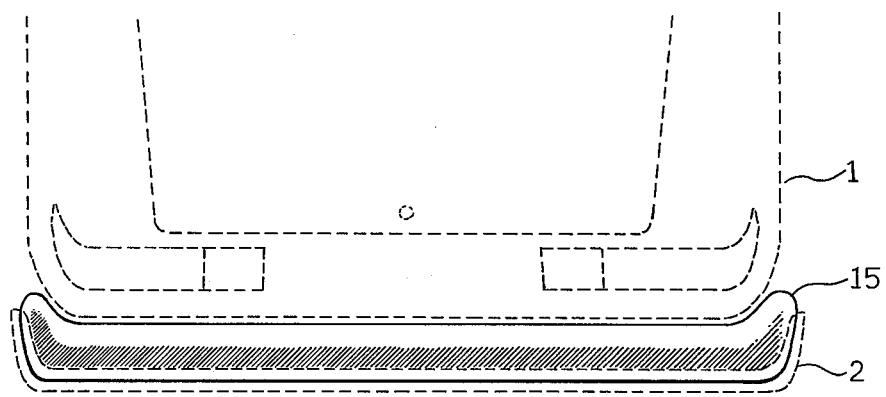
FIG. 16. Top rear plan view thereof.
Figure 17:
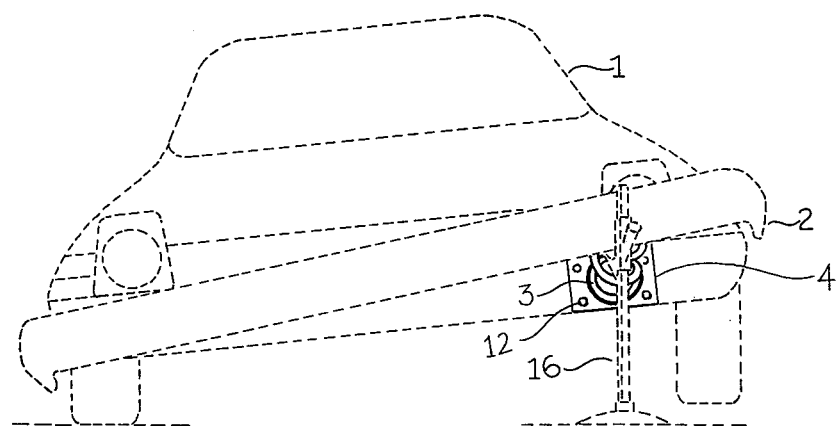
FIG. 17. Front view showing jack inserted under the Multiple Stage Flexible Bumper.

Note: The broken lines in the drawings are for illustration purposes only.

DETAILED DESCRIPTION OF THE INVENTION

No. 1. Vehicle body.
No. 2. Bumper bar.
No. 3. Primary Coil Compression spring, stage one.
No. 4. Spring seat.
No. 5. Simulated 360° movement of outward end of spring.
No. 6. Retainer bolt.
No. 7. Longitudinal frame.
No. 8. Longitudinal mounting bolts, rivets or welds.
No. 9. Simulated tree barrier.
No. 10. Outside collar.
No. 11. Inside collar in seat to anchor primary springs to bumper bar stage one.
No. 12. Mounting holes for spring seat.
No. 13. Retainer bolt holes.
No. 14. Retainer bolt nut.
No. 15. Flexible filler panel.
No. 16. Jack.
No. 17. Helper coil compression spring, stage two.
No. 18. Helper coil compression spring, stage three.
No. 19. Helper coil compression spring, stage four.
No. 20. Inside collar in seat to anchor the inward ends of all four stages of springs to the longitudinal frame.

When the bumper bar 2 is struck by an object 9 in front of it, the primary coil springs 3 absorb the energy of motion, protecting the car body 1 and its occupants. Said primary coil springs 3 are held in place by spring seats 4 which are mounted at one end of the primary coil spring 3 to the longitudinal frame 7 and the other end of the primary coil spring 3 to the bumper bar 2 with nothing between but the telescoping helper springs 17, 18 and 19 which make stages two, three and four. Said springs are held in the spring seat 4 by retainer bolt 6 and nut 14. These bolts pass through the outside collars 10 and inside collars 11 and 20 directly before the last loop of wire of stage one at the bumper bar and stages one, two, three and four at the longitudinal frame end of the vehicle. A simulated tree barrier 9 shows how the one side of the bumper bar 2 can absorb the energy independent of the other side. The spring seat is secured to the vehicle frame 7 and bumper bar 2 by longitudinal mounting means 12 and the complete movement of the outer ends of the coil springs are shown by the simulated 360° circle 5 around the central longitudinal frame axis 7. The flexible filler panel 15 covers the gap between the bumper bar and car body. A simulated jack 16 is placed under the bumper bar to lift the car at the wheel. Helper coil springs 17 absorb the load as a second stage when the primary springs 3 become overloaded. Helper springs 18 absorb the load as stage three when the primary springs 3 and helper springs 17 become overloaded. Helper springs 19 absorb the load when the primary springs 3 and the helper springs 17 and 18 become overloaded. Inside collar 20 is to anchor all four stages of springs at the longitudinal frame 7.

The retainer bolt 6 passes through the outside collar 10 and inside collar 20 directly before the last loop of wire on the inward ends of all four stages of the springs at the longitudinal frame.

I claim:

1. In a highway type motor vehicle, a Multiple Stage Flexible Bumper comprising in combination a bumper bar mounted transversely across the front of the motor vehicle, a plurality of multiple stage telescoping coil compression springs, each comprising a primary spring and at least one helper spring, a pair of spring seats for each compression spring, means for securing the ends of the compression springs in the seats, means for securing the seats on one end of the compression springs to the vehicle frame and means for securing the seats on the other end of the compression springs to the vehicle bumper bar in longitudinal alignment by means of one end of the primary springs and the helper springs anchored firmly at the inward ends by the seats located at the longitudinal frame of the vehicle, each seat at the longitudinal frame comprising a flat base plate with an inside collar and outside collar, retainer bolts parallel to the flat base plate, located inside the last loop of wire at the spring ends, said retainer bolts passing through the outside collar and inside collar, having longitudinal mounting holes through the flat base plate for rigidly securing the flat side of the spring seat against the flat end of the vehicle frame and the outward ends of the primary springs, stage one, anchored firmly by the seats located at the bumper bar so as to have the helper springs, stage two, shorter in length and smaller in diameter than the primary springs, with the outward ends of stage two floating unattached inside the inside diameter of the primary springs stage one until they are moved against laterally or longitudinally to form a completely flexible, 360° unencumbered movement of the bumper bar around the axis of the longitudinal frame of the motor vehicle and allow the bumper bar to provide maximum protection from all types of angular collisions when the bumper bar strikes an obstruction before it or at the corner of it by means of the long coil compression springs absorbing the energy of motion into stages one and two so as to increase the resistance as the load increases causing a cushioning effect of deceleration and help prevent bent frames, broken welds and dented sheet metal in minor accidents and to help save the operator and occupants of the motor vehicle unnecessary death, injury, damage, expense and frustration in high-speed accidents.

2. The invention as set forth in claim 1 in which each compression spring comprising a primary spring and one to three helper springs, the number, spring size, shape and amount of motion desired are directly related to the size of the motor vehicle and the need for said maximum protection from the bumper bar.

3. The invention as set forth in claim 1 in which the coil springs are located on the ends of the longitudinal frame of the motor vehicle putting the unobstructed coil springs between the frame and body of the motor vehicle and the bumper bar and the obstruction.

4. The invention as set forth in claim 1 in which each set of spring seats comprising an outside collar and inside collar with retainer bolts and the primary spring stage one firmly anchored at each end in said seats, each compression spring comprising three helper springs and the helper springs stages two, three and four firmly anchored at their inward ends only at the longitudinal frame with the outward ends of said helper springs floating free in telescopic action inside the primary spring until the forces of a collision move laterally or longitudinally against the unattached outward ends of the helper springs and compress them in stages, so as the load increases so does the resistance increase with one set of said spring seats attached by longitudinal bolts, welds or rivets to the outside ends of the longitudinal frame of the motor vehicle and another set of said spring seats attached in longitudinal alignment, by longitudinal bolts, welds or rivets to the inside surface of the bumper rail of the motor vehicle thereof.

5. The invention as set forth in claim 1 in which no other structure of the motor vehicle frame or body except a flexible filler panel located over the compression springs interferes with or touches the 360° free unencumbered movement of the outward end of the springs around its anchor point, which is the longitudinal axis of the motor vehicle frame.

6. The invention as set forth in claim 1 in which the number of stages of coil springs either more stages or less stages are of sufficient strength and rigidity to prevent permanent deformation when jacking the car up by placing the jack under the bumper bar and having a flexible filler panel over the springs for aesthetics.

7. The invention as set forth in claim 1 in which a Multiple Stage Flexible Bumper is attached to both the front and the rear extremities of the vehicle.

* * * * *